US008670604B2

(12) United States Patent
Eggert et al.

(10) Patent No.: US 8,670,604 B2
(45) Date of Patent: Mar. 11, 2014

(54) MULTI-OBJECT TRACKING WITH A KNOWLEDGE-BASED, AUTONOMOUS ADAPTATION OF THE TRACKING MODELING LEVEL

(75) Inventors: Julian Eggert, Obertshausen (DE); Chen Zhang, Frankfurt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 453 days.

(21) Appl. No.: 12/951,127

(22) Filed: Nov. 22, 2010

(65) Prior Publication Data

US 2011/0129119 A1 Jun. 2, 2011

(30) Foreign Application Priority Data

Dec. 1, 2009 (EP) ..................................... 09177644

(51) Int. Cl.
 *G06K 9/00* (2006.01)
(52) U.S. Cl.
 USPC ......................................................... 382/131
(58) Field of Classification Search
 None
 See application file for complete search history.

(56) References Cited

U.S. PATENT DOCUMENTS

| | | | |
|---|---|---|---|
| 6,295,367 B1 | 9/2001 | Crabtree et al. | |
| 7,463,754 B2 | 12/2008 | Yang et al. | |
| 7,929,730 B2 * | 4/2011 | Huang et al. | 382/103 |
| 8,131,012 B2 * | 3/2012 | Eaton et al. | 382/103 |
| 8,279,286 B2 * | 10/2012 | Wagg et al. | 348/169 |
| 2003/0179294 A1 * | 9/2003 | Martins | 348/157 |
| 2005/0185826 A1 | 8/2005 | Georgescu et al. | |
| 2005/0195826 A1 * | 9/2005 | Fisher et al. | 370/395.4 |
| 2007/0092110 A1 * | 4/2007 | Xu et al. | 382/103 |
| 2007/0122001 A1 * | 5/2007 | Wang et al. | 382/103 |
| 2008/0193010 A1 * | 8/2008 | Eaton et al. | 382/159 |
| 2009/0087085 A1 * | 4/2009 | Eaton et al. | 382/159 |
| 2009/0110236 A1 | 4/2009 | Huang et al. | |

FOREIGN PATENT DOCUMENTS

WO 2008/098188 8/2008

OTHER PUBLICATIONS

EP Communication, EP Search Report, May 28, 2010, EP 09 17 7644, a total of 9 sheets.
Aeron Buchanan et al., Combining Local and Global Motion Models for Reature Point Tracking, IEEE, 2007, 8 sheets.
M. Sanjeev Arulampalam et al., "A Tutorial on Particle Filters for Online Nonlinear/Non-Gaussian Bayesian Tracking", IEEE Transactions on Signal Processing, vol. 50, No. 2, Feb. 2002, pp. 174-188.
R.E. Kalman, "A New Approach to Linear Filtering and Prediction Problems", Transactions of the ASME—Journal of Basic Engineering, 82 (Series D), 1960, pp. 35-45.
Martin Spengler et al., "Multi-Object Tracking Based on a Modular Knowledge Hierarchy", In Proceedings of International Conference on Computer Vision Systems, 2003, pp. 376-385.
E. Mazor et al., "Interacting Multiple Model Methods in Multitarget—Multisensor Tracking Survey", IEEE Transactions on, 34, 1998, pp. 1-35.

* cited by examiner

*Primary Examiner* — Nancy Bitar
(74) *Attorney, Agent, or Firm* — Squire Sanders (US) LLP

(57) ABSTRACT

The invention proposes a method for object and object configuration tracking based on sensory input data, the method comprising the steps of:
(1.1) Basic recruiting: Detecting interesting parts in sensory input data which are not yet covered by already tracked objects and incrementally initializing basic tracking models for these parts to continuously estimate their states,
(1.2) Tracking model complexity adjustment: Testing, during runtime more complex and more simple prediction and/or measurement models on the tracked objects, and
(1.3) Basic release: Releasing trackers from parts of the sensory data where the tracker prediction and measurement processes do not get sufficient sensory support for some time.

18 Claims, 4 Drawing Sheets

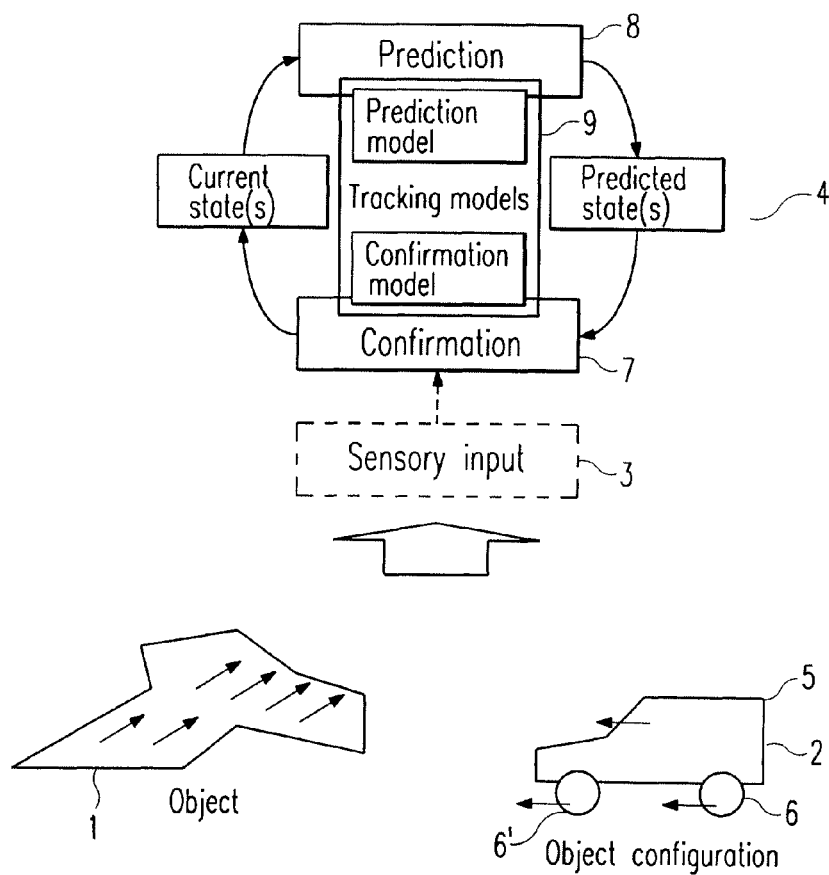

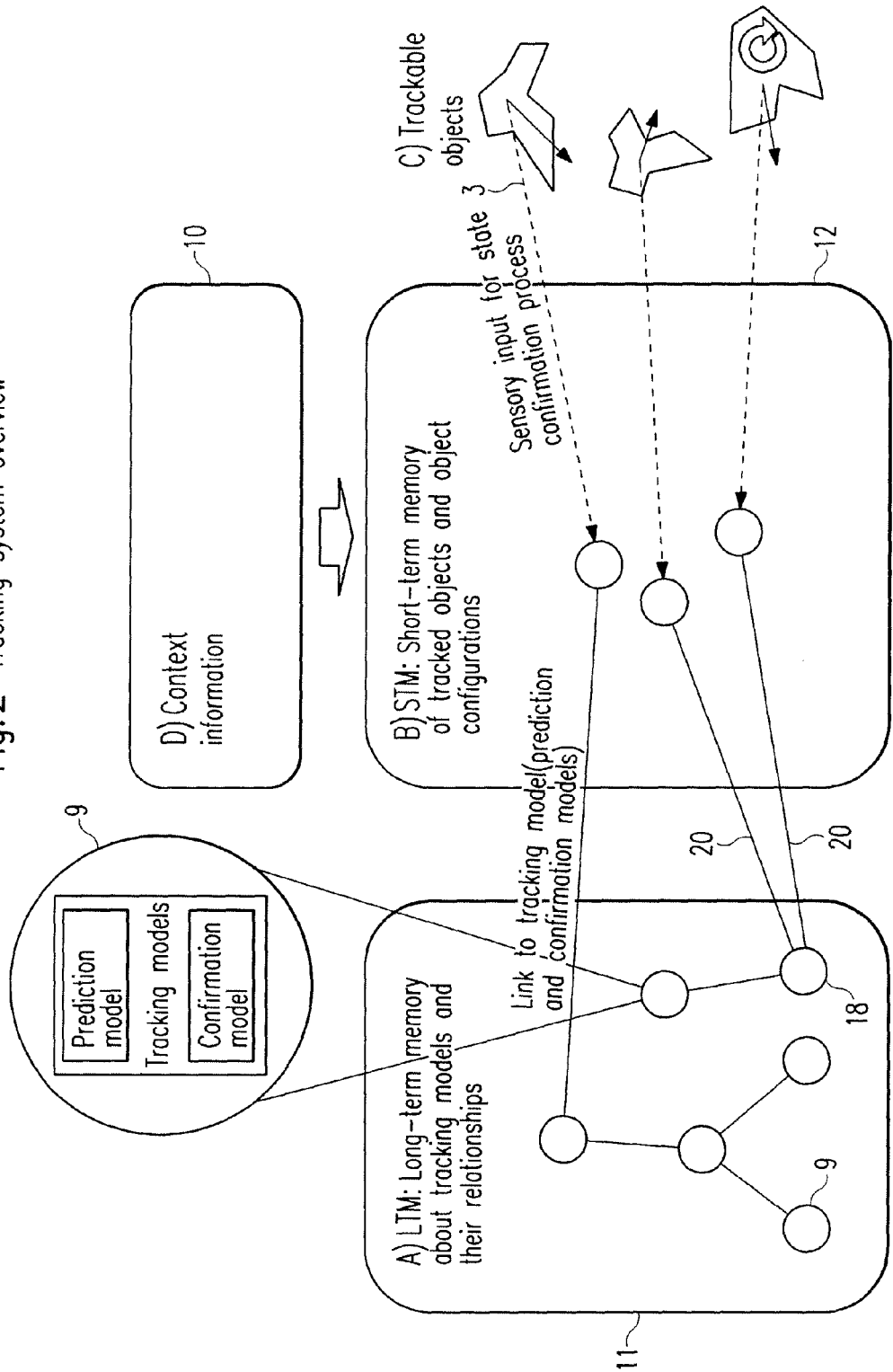
Fig. 2 – Tracking system overview

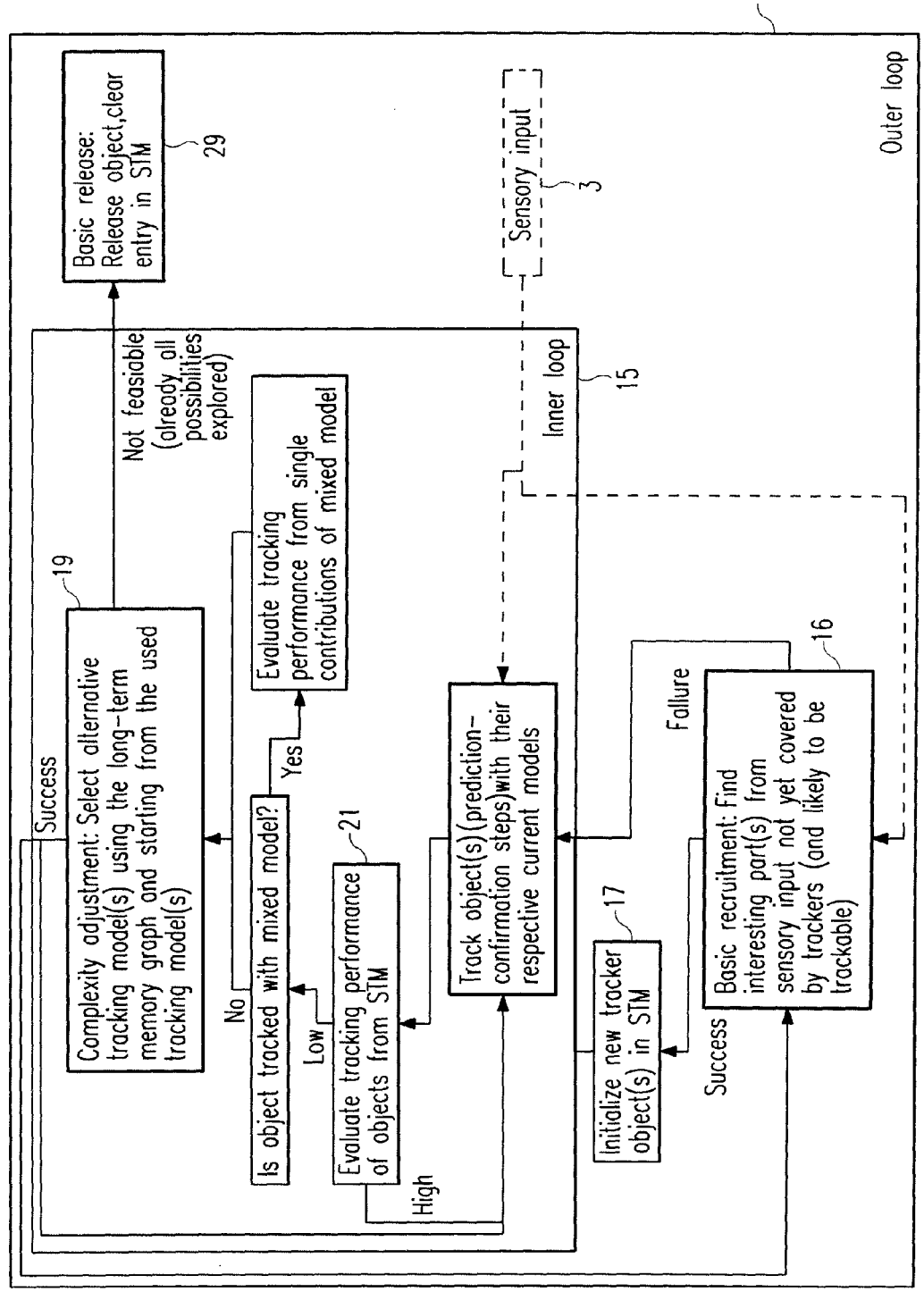
Fig. 3 – System process flow/inner and outer loop

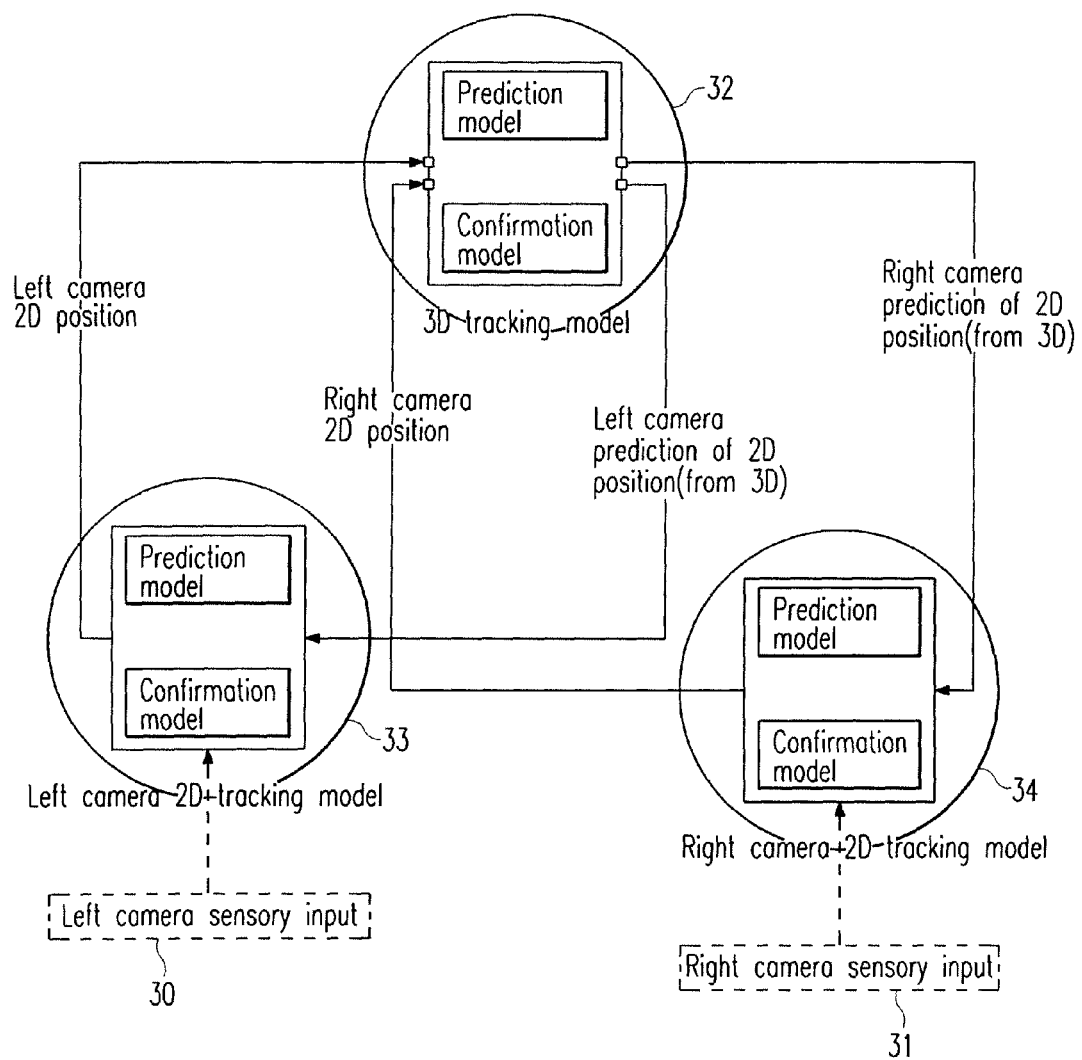
Fig. 4 – Example of combined 3D/2D tracking model hierarchy

MULTI-OBJECT TRACKING WITH A KNOWLEDGE-BASED, AUTONOMOUS ADAPTATION OF THE TRACKING MODELING LEVEL

The present invention describes a sensor-based system for tracking objects and object configurations that adapts the complexity of the involved modeling level. The adaptation occurs autonomously by a situation-dependent adjustment and by incorporating knowledge in form of prototypical relationship graphs between tracking models.

Generally a tracking system in the present invention processes sensory data and generates control signals in order to make a sensor track one or more targets in the input field of the sensor(s), or indicates the region of one or more tracked targets in the input field of the sensor(s).

BACKGROUND OF THE INVENTION

Target tracking such as e.g. visual (video-based) target tracking is a topic of major relevance to a large series of computer vision domains involving monitoring, surveillance, guidance, obstacle avoidance and scene interpretation. The application domains include diverse fields such as radar control, traffic monitoring or vision-based robotics.

Tracking an object involves model descriptions of 1) how the object parameters evolve over time and as well as 2) how the estimated state of an object can be related to a sensory measurement. These two models have to be tailored to the specific object that should be tracked and its dynamics, e.g. by indicating that the object behaves in a ballistic fashion according to Newtonian physics and e.g. a sensory measurement using a characteristic, known object color.

For domain-specific applications, a single, fixed description of the involved models is sufficient. In a situation involving complex visual scenes, however, a system is needed that allows a dynamic switching and adaptation of the involved models. An example is e.g. a situation of a bouncing ball target, which moves in a ballistic fashion while falling down but rebounds when hitting the floor, making a different motion model necessary.

The current way of dealing with such situations is by introducing mixture models [1] which are treated probabilistically, allowing the tracking system to give more weight to those models that best fit with the sensory observations.

The drawback of currently available tracking models is that all the possible single models used for the mixture have to be directly integrated into the tracking process from the start, and that they have to be evaluated simultaneously.

Nevertheless, if one considers that the complexity level of objects that can be tracked is not fixed, that objects can be arranged into trackable object configurations, and that this may occur hierarchically by arranging object configurations into even larger, trackable ensembles, the potential space of tracking models becomes combinatorially large. No previously fixed mixture of tracking models can then be devised to cover the entire range of possible tracking models.

PRIOR ART

Tracking is the estimation of the dynamic parameters of objects from a sensory input. Well-known examples are position tracking for moving objects; in this case, the goal is not to loose an object and to accurately estimate its 2D or 3D position, velocity, etc.

A typical tracking process together with its tracking models is shown in FIG. 1.

As shown in FIG. 1, an object 1 or an object configuration 2 is sensed by a sensor device 3 generating sensory input for the tracking system 4.

Under "object configuration" 2 it is to be understood that objects, such as for example a car body 5 and wheels 6, 6' carrying out different movements (pure displacement in case of the car body 5 and a combination of displacement and rotation in case of the wheels 6, 6') are grouped together as they carry out one common trackable movement, which in the present example is the displacement of the car as such.

The tracking process and tracking system shown in FIG. 1 essentially comprises a confirmation module 7 as well as a prediction model 8.

The tracking system 4 is provided with tracking models 9. As already explained, the tracking models 9 are descriptions of how the object parameters evolve over time as well as how the estimated state of an object can be related to a sensory input.

As shown in FIG. 1, the tracking involves two steps, termed in the following prediction and confirmation or measurement, and which are defined by their corresponding prediction and confirmation or measurement models, also shown in FIG. 1. In the prediction step, the estimated parameters of the object represented by an internal state are extrapolated into the future by a chosen dynamical model that describes how the state is expected to change in time, usually yielding a series of hypothetical future states. In the confirmation step, the series of hypothetical future states are compared for compatibility with the sensory input, and those states that provided a good prediction of the future state then dominate the estimation of the current state.

In short, a tracking process imposes a constrained search strategy for the dynamical state estimation of a target, where the hypotheses are generated and confirmed according to prior knowledge about the tracked objects in form of preset models and the quality of the models has a large impact on the quality of the tracking process. It is therefore crucial to find the right models for a given tracking task and situation. Along the same line of argumentation, it is also of importance to find the right level of granularity and abstraction of the models. A tracker could e.g. estimate the wheels of a car each separately. But this is probably not the best level of abstraction for describing the dynamics, since it is advantageous to have an internal prediction model that indicates that the wheels movement is generated by a common cause, in this case a moving car to which the wheels are attached to.

No single tracking model exists that fits equally well to all situations and all levels of granularity. Furthermore, in dynamic scenes, the movement of the object varies and so do the optimal tracking models. For optimal and efficient tracking, an autonomous adjustment of the description models involved in the tracking process is therefore necessary.

The probabilistic main stream of researchers refers to tracking on a level of dynamic Bayesian inference (e.g. [1]), describing it as a stochastic state estimation problem in discrete time. Here, a state vector x of the target contains parameters of the object like its position, velocity and acceleration and so on. The Bayesian methods first predict new states of the target (i.e., the expected states at the next timestep, together with their occurrence probability) using a state prediction model. Then they use a measurement of the state of the target to evaluate (i.e. either confirm or reject) the predicted states of the target.

The exemplary Bayesian formulas below describe this two-step behavior of current tracking methods $$p(x_k|Z_{1:k-1}) = \int p(x_k|x_{k-1}) p(x_{k-1}|Z_{1:k-1}) dx_k$$

$$p(x_k|Z_{1:k}) \sim p(Z_k|x_k) p(x_k|Z_{1:k-1})$$

based on the states x (with their temporal indices) and the sensory measurements Z (Z with indices 1:k representing all measurements from time-steps 1 through k, and ~ meaning "proportional to"). The first line gives the probability of a new, predicted state x given all past measurements (the prediction step), whereas the second line expresses that the probability of the current state is a multiplicative ("Bayesian") combination of the so-called measurement likelihood with the predicted state (the confirmation step).

There exist several ways of implementing the Bayesian formulas, depending on the linearity nonlinearity of the involved steps, like Kalman filtering [2], or sequential Monte Carlo estimation using particle filters [3].

In state-of-the-art methods, increasing the level of complexity of the tracker models involves an extension of the state vector and therefore indirectly of the related models for the prediction and confirmation steps. An example of how this is approached for object configurations is given in [4]. It also involves a decision of what the maximal state vector can be, incorporating the knowledge directly into it.

A further prior art approach is given by tracking algorithms based on multiple switching dynamic models [5] or IMM's (interacting multiple models) [6]. These are hybrid filtering methods which evaluate several tracking models (e.g. prediction models and/or likelihood models) in parallel and include an internal switching dynamics between the models themselves.

Previous tracking algorithms have also made use of a multitude of adaptation methods to improve the tracking process. E.g. in [7], a system is described that learns and adapts its internal representation to intrinsic as well as extrinsic changes based on a time-varying Eigenbasis description of the appearance of the tracked object. However, in the invention proposed here we present as a novel aspect an adaptation at the level of switching between different prediction resp. confirmation models, which provides a way of incorporating higher-level model-, object- and context knowledge in form of a corresponding hierarchical knowledge basis.

Finally, graphical representations are heavily used in computer vision, tracking (e.g. [8]) and probabilistic modeling, mainly for the low-level sensory decomposition of the visual. The invention extends them for the purpose of describing relationships between modeling processes. In this invention, these involve nodes that represent the different models and undirected or directed edges to describe neighborhood relations, possible transitions or dependencies between models. Hierarchical representations deserve special consideration of tracking models as e.g. representable by directed acyclic graphs (DAG).

U.S. Pat. No. 6,295,367B1 (reference 8) discloses a system and method for tracking movement of objects in a scene from a stream of video frames using first and second correspondence graphs. A first correspondence graph, called an object correspondence graph, is formed comprising a plurality of nodes representing region clusters in the scene which are hypotheses of objects to be tracked, and a plurality of tracks. Each track comprises an ordered sequence of nodes in consecutive video frames that represents a track segment of an object through the scene. A second correspondence graph, called a track correspondence graph, is created, comprising a plurality of nodes, each node corresponding to at least one track in the first correspondence graph. A track comprising an ordered sequence of nodes in the second correspondence graph represents the path of an object through the scene. Tracking information for objects, such as persons, in the scene, is accumulated based on the first correspondence graph and second correspondence graph.

OBJECT OF THE INVENTION

It is the object of the invention to at least alleviate the introduced tracking problems. The object is achieved by means of the features of the independent claims. The dependent claims develop further the central idea of the present invention.

The invention proposes a method for an autonomous, adaptive adjustment of the model complexity needed to track an object or an object configuration. One aspect of the invention resided in the idea that there is background knowledge in the system about how the level of complexity of a tracking model can be increased (e.g. by imposing further dynamical constraints, or by letting an object participate in a object configuration) or decreased (e.g. by loosening dynamical constraints or by releasing an object from an object configuration), and that, depending on the tracking success of higher-level or lower-level tracking models, these are switched accordingly.

In summary, the invention allows to adapt the tracking process dynamically, during run-time, to the appropriate abstraction level to yield a better tracking performance. It also allows to trade off tracking model complexity, accuracy and computational costs by choosing the appropriate modeling level along a hierarchy of models. Adaptive configuration tracking can exploit the hierarchical structure to adapt to the right complexity level in terms of the number of properties of parts and subparts that constitute a tracked object. In addition, such a tracking system can adjust very effectively to extrinsic changes in a tracked object's dynamic behavior, e.g. when a falling ball changes abruptly its trajectory as soon as it hits a rigid surface, demanding a different prediction model of the object dynamics.

Further objects, advantages and features of the invention will now be explained with reference to the figures of the enclosed drawings.

FIG. 1 thereby shows a typical tracking process together with its tracking models, FIG. 2 shows a long-term memory knowledge database about tracking models and their relationship combined with a short-term sensory memory for the multi-object tracking system, FIG. 3 shows a tracking system with two working loops according to the invention, and FIG. 4 shows a specific example system for combined 2D/3D tracking.

DETAILED DESCRIPTION OF THE INVENTION

The present invention proposes a method and a system for object and object configuration tracking that makes use of an autonomous, situation-dependent adjustment of the tracker modeling level for optimal tracking. The adjustment occurs by means of mixed model evaluation incorporating several tracking models from neighboring complexity levels, and the knowledge that enables the selection of suitable tracking models is given by a system-inherent graphical representation of the tracking models and their relationships.

The invention proposes a long-term memory knowledge database 11 about tracking models 9 and their relationship combined with a short-term sensory memory 12 for the multi-object tracking system (STM, FIG. 2B).

The long-term memory 11 is a unit storing relationships between tracking models 9, while the short term memory has the data for the tracking process itself.

The long-term memory database 11 contains, for each tracking model 9, information of the prediction and/or confirmation models that should be used during the tracking process. The multi-object tracking system in the short term memory 12 contains state information about the currently tracked objects or object configurations and executes the prediction and confirmation steps (defined by the corresponding tracking model from the long-term memory 11) needed for the target state estimation. The confirmation step directly relates the internal representations of the tracked objects with the objects 1 in the outer world. Furthermore, the tracking models 9 may need additional information about the world/context, this is then contained by additional short-term and long-term context memories 10 (in the example, only a short term context memory 10 is shown, although a corresponding memory can be present also for the long term memory 11).

The tracking system has two working loop modules, i.e. an inner loop module 15 and an outer loop module 14 as shown in FIG. 3. Both loops 14, 15 are provided with sensory input 3.

The outer loop module 14 decides on basic tracker recruitment and thus comprises a basic recruitment module 16: It detects interesting parts in the supplied sensory input 3 which are not yet covered by already tracked objects (i.e., tracked objects with representations in the short-term memory 12) and initializes basic trackers 17 for these parts (objects).

The basic trackers 17 are nodes 18 of the tracking model graph representation (FIG. 2) in the long-term memory 11 which directly involve sensory measurements for tracking state confirmation. It is also the task of the outer loop 14 to decide on the lifetime of tracked objects in the short term memory 12, and to release 29 the tracking of objects that do not receive sufficient sensory support in the confirmation phase any more. The reasons for tracker release 29 can be of many kinds and may be caused by internal or external events, such as a wrong choice of tracker models or simply the disappearance of an object from the sensory input field 3.

The inner loop module 15 comprises an autonomous complexity adjustment module 19 for the tracking models in the short-term memory 12.

This is achieved by (i) scanning the tracking model graph from the long-term memory 11 to select alternative tracking model candidates related to the current ones (in terms of graph connectivity), (ii) the performance evaluation of the alternative tracking model candidates and (iii) the decision if one of the alternative models will be used to continue tracking a given object.

The complexity adjustment 19 can be achieved by modification of the prediction and/or confirmation models, e.g. by using a model for 3D motion constrained to run perpendicular to a given support surface such as it is the case for cars on a street, instead of an unconstrained 3D motion model. It also may include the combination of several, previously independently tracked objects into an object configuration that is then tracked as a single compound, imposing constraints on the possible positions of each constituting object. A complexity decrease of tracking models in the short-term memory 12 would e.g. be given by a less complex/less constrained motion model or by the splitting up of an object configuration tracker into several single object trackers.

For the purpose of autonomous complexity adjustment 19, during operation each tracked object or object configuration retains a memory link to the current and past tracking model(s) from the long-term memory 11 (FIG. 2, links 20 between LTM 11 and STM 12). This enables the exploration of the long-term memory graph for possible alternative tracking models. E.g., tracking models 9 that are neighbors in the graph to the currently used tracking model can be evaluated and the tracking model(s) of an object can be changed. The changed memory link then has consequences on the tracked object performance (evaluated by a tracking performance evaluation module 21), since different prediction and confirmation models are used during the tracking process.

During the process of tracking model complexity adjustment 19, it is often sensible to allow tracking models to coexist during some time. In the system according to the invention this means that the two tracking models are executed in parallel, in a mixed mode. In a first variant, these run independently from each other and are evaluated separately at each time-step, e.g. in terms of their probabilistic properties such as the confidence of the object state estimation. In a second variant, the two models can be mixed into a joint probabilistic framework (see prior art mention of multiple switching dynamic models for tracking), but again leading to an evaluation of the performance of each model for each time-step. After a temporal integration of the evaluation, a decision is then taken on which tracking model(s) to use. However, if tracking performance is sufficiently high (as assessed by module 21), it is often desirable to continue tracking objects using a mixed model, since with such a method temporal weaknesses of one model can be rapidly compensated by other models. In this case, the long-term memory graph of tracking models provides valuable information on which models should be mixed (e.g. models that are close to each other in terms of graph relationships).

EXAMPLE

A specific example for a combined 2D/3D tracking system is shown in FIG. 4. A stereo video camera 30, 31 (being an example for streaming sensors) supplies "binocular" 2D video data to the tracking system and such comprises a "left" video camera 30 and a "right" video camera 31. The tracking system (i.e. the entire system shown in FIG. 3) processes these supplied video data 30, 31.

The long-term memory 11 contains tracking model descriptions of trackers working in 2D and in 3D, i.e. a 3D tracking model 32, a left camera 2D tracking model 33 and a right camera 2D tracking model 34. The trackers 33, 34, working in 2D contain a simple, 2D ballistic prediction model to describe the position of objects on a camera image, and also apply their measurement models directly on these images to confirm the expected positions.

The 3D tracker 32 contains a ballistic prediction model working in 3D world coordinates. Its measurement model is based on the result of two lower-level 2D trackers 33, 34 resp. their 2D positions, with each 2D tracker 33, 34 working on a separate camera 30, 31.

The context memory (10 in FIG. 2) in this case contains information about the position and orientation of the cameras in the world coordinate system needed by the 3D tracker. For the sake of a simple explanation, it is assumed that the cameras are arranged like in a binocular system, and call them "left" and "right".

The 3D tracking model 32 then assumes that results from the left and right 2D tracking models 33, 34 (the estimated left and right 2D camera positions) are delivered as sensory input and used for the higher-level tracker state confirmation step, as can be seen in FIG. 4. Similarly the predicted states of the 3D tracking model 32 are projected downwards (in the tracking model graph structure) towards the left and right 2D tracking models 33, 34, constraining the 2D regions where these trackers 33, 34 should expect an object. Finally, the left and right 2D trackers 33, 34 seek the confirmation of their state by applying their measurement model on the left and right camera images 30, 31, respectively.

During operation, at first, the basic tracker recruitment module (16 in FIG. 3) sets the 2D trackers 33, 34 on identifiable objects, independently for the left and right cameras 30, 31. From the long-term memory graph (11 in FIG. 2) of tracking models, the system infers that a tracked object from the left camera 30 can be combined with a tracked object from the right camera 31. It then tries to initialize (17 in FIG. 3) a tracked 3D object with its corresponding 3D tracking model. The 3D tracker 32 then makes use of the result of the already initiated 2D trackers 33, 34, using their state estimations as basis for its own measurements and constraining the predictions of the 2D trackers 33, 34. These can work in mixed mode, combining their own 2D prediction model(s) with the prediction delivered from the 3D tracker 32. In a sense, the 3D tracker 32 is both a configuration tracker (since it uses a combination of two objects) as well as a higher level tracking model, since it now uses a true 3D model for state prediction and confirmation.

PRIOR ART REFERENCES

1. Arulampalam, S., Maskell, S., Gordon, N.: A Tutorial on Particle Filters for Online Nonlinear/Non-Gaussian Bayesian Tracking. IEEE Transactions on Signal Processing 50, p. 174-188, 2002
2. Kalman, R. E.: A New Approach to Linear Filtering and Prediction Problems. Transaction of the ASME, Journal of Basic Engineering, p. 35-45, 1960
3. Doucet, A., De Freitas, N., Gordon, N. J.: Sequential Monte Carlo Methods in Practice. Springer, 2001
4. Spengler, M., Schiele, B.: Multi-object Tracking Based on a Modular Knowledge Hierarchy. In Proc. of International Conference on Computer Vision Systems, 2003
5. Ristic, B., Arulampalam, S., Gordon, N.: Beyond the Kalman Filter. In: Particle Filters for Tracking Applications. Artech House, London, 2004
6. Mazor, E., Averbuch, A., Bar-Shalom, Y., Dayan, J.: Interacting Multiple Model Methods in Target Tracking: a Survey. Aerospace and Electronic Systems, IEEE Transactions on, 34(1):103-123, 1998
7. Yang, M.-H., Lim J., Ross, D., Lin, R.-S.: "Adaptive probabilistic visual tracking with incremental subspace update", U.S. Pat. No. 7,463,754
8. Crabtree, R. N., Moed, M. C., Khosravi, M.: "System and method for tracking movement of objects in a scene using correspondence graphs", U.S. Pat. No. 6,295,367

We claim:

1. A method for tracking objects based on sensory input data (3) supplied from a stereo video camera (30, 31), the method comprising the following steps:
    processing, via a processor comprising a long-term memory and a short-term memory database, the sensory input data (3) supplied using one or more tracking models (9), each tracking model comprising a tracker prediction and a measurement process,
    deciding (16) whether the sensory input data (3) contain parts not yet covered by the tracking model (9), and in a positive case, initializing new tracking models,
    releasing (29) a tracked object if the tracker prediction and the measurement process do not get sufficient sensory support for some time, and
    adjusting an abstraction level of the tracking models used by evaluating performance of tracking models during run-time and using the tracking models showing an optimum performance according to a performance criterion, wherein the abstraction level of the tracking models is adjusted by scanning a tracking model graph from the long-term memory to select alternative tracking model candidates related to current ones in terms of graph connectivity, evaluating performance of the alternative tracking model candidates, and deciding whether to use one of the alternative tracking model candidates as a tracking model based on a comparison of results of the evaluating for each tracking model.

2. The method of claim 1, wherein the abstraction level is adjusted by combining independently tracked objects of the tracked objects into an object configuration that is then tracked as a single compound, wherein the object configuration comprises an object with multiple movements grouped together.

3. The method of claim 1, comprising the steps of:
    detecting parts in sensory input data (3) which are not yet covered by already tracked objects and incrementally initializing basic tracking models (17) for these parts to continuously estimate states of not-yet tracked objects,
    testing, during runtime, more complex and more simple prediction and measurement models on the tracked objects, and
    releasing trackers from parts of the sensory input data (3) where the tracker prediction and measurement processes do not get sufficient sensory support for some time.

4. The method according to claim 3, wherein the testing comprises:
    choosing new prediction and measurement model candidates from a suitable, situation-dependent set of models, and determine if an alternative prediction and measurement model will be used for further tracking of an object or object configuration.

5. The method of claim 4, where the choosing of the situation-dependent set of prediction and/or confirmation models is supported by a graph-like structure comprising the steps of:
    storing a basic graph structure of tracking models that describes the tracking models and neighborhood relationships between the tracking models, wherein the graph structure has been created by design or acquired by a learning system,
    during object tracking, selecting prediction and measurement models from the tracking models available in the graph structure, each tracked object retaining a memory of which model(s) from the graph structure it is using, and
    during tracking model complexity adjustment, using the neighborhood relationships of the tracking models and a position in the graph structure of a tracked object to systematically reduce a set of model candidates that are inspected.

6. The method of claim 5, where the graph structure from the storing gets adjusted, improved and extended by evaluating statistics of the tracked objects and supervised data from a tutoring instance.

7. The method of claim 5, where the graph structure of prediction and measurement models is hierarchical and has a form of directed acyclical graphs.

8. The method of claim 5, where parts of the graph structure represent compositionality information, wherein several subordinate trackers can be merged by virtue of a superordinate tracker that constrains or influences the subordinate trackers.

9. The method of claim 5, where parts of the graph structure represent information on how to combine different subordinate trackers from different sensory modalities.

10. The method of claim 9, where a constraint or influence of a superordinate tracker on subordinate trackers involves a state transformation step to adjust to a state description of the subordinate trackers.

11. The method according to claim 1, where the tracking models are implemented by probabilistic methods.

12. The method according to claim 1, wherein the sensory input data are data from a stereo video camera.

13. A computer software program product stored on a non-transitory computer readable medium, implementing a method according to claim 1 when run on a computing device.

14. A computer-based tracking system, provided with streaming sensors and having a computing unit designed for performing a method according to claim 1.

15. The method of claim 9, wherein the different sensory modalities comprise combined objects from different cameras by exploiting their sensory causes as a single physical object, represented by a superordinate tracker.

16. The method of claim 10, wherein the superordinate tracker operates in 3D and constrains the subordinate tracker working in 2D, thereby making a 3D to 2D coordinate transformation step necessary when passing information from the superordinate tracker operating in 3D to the subordinate tracker working in 2D.

17. The method of claim 11, wherein the probabilistic methods comprise one or more of Dynamic Bayesian Networks, particle filters, and multiple switching dynamic models for mixing and evaluation of prediction models.

18. The method of claim 14, wherein the streaming sensors comprise video cameras.

* * * * *